United States Patent
Kim

[11] Patent Number: 5,887,205
[45] Date of Patent: Mar. 23, 1999

[54] APPARATUS AND METHOD FOR MAGNETICALLY RECORDING PHOTOGRAPHIC DATA FOR AN ADVANCED PHOTO SYSTEM CAMERA

[75] Inventor: Byung-Su Kim, Kyeongsangnam-do, Rep. of Korea

[73] Assignee: Samsung Aerospace Industries, Ltd., Kyeongsangnam-do, Rep. of Korea

[21] Appl. No.: 883,631

[22] Filed: Jun. 26, 1997

[30] Foreign Application Priority Data

Jun. 28, 1996 [KR] Rep. of Korea .................. 1996-24927

[51] Int. Cl.$^6$ .................................. G03B 17/24
[52] U.S. Cl. ......................... 396/319; 396/406
[58] Field of Search ........................ 396/310, 311, 396/319, 320, 395, 397–400, 406, 387

[56] References Cited

U.S. PATENT DOCUMENTS

| | | | |
|---|---|---|---|
| 5,029,313 | 7/1991 | Robison et al. | 355/40 |
| 5,184,161 | 2/1993 | Egawa | 354/105 |
| 5,264,683 | 11/1993 | Yoshikawa | 235/375 |
| 5,416,545 | 5/1995 | Izukawa | 354/105 |
| 5,450,149 | 9/1995 | Cocca | 354/106 |
| 5,493,355 | 2/1996 | Kazami | 354/106 |
| 5,640,629 | 6/1997 | Hibino et al. | 396/319 |
| 5,649,246 | 7/1997 | Hibino et al. | 396/319 |
| 5,724,623 | 3/1998 | Tamamura | 396/319 |
| 5,742,856 | 4/1998 | Izukawa | 396/319 |
| 5,745,812 | 4/1998 | Taillie | 396/319 |

FOREIGN PATENT DOCUMENTS 0 693 705 A1  1/1996  European Pat. Off. .

*Primary Examiner*—Safet Metjahic
*Assistant Examiner*—Michael Dalakis
*Attorney, Agent, or Firm*—Finnegan, Henderson, Farabow, Garrett & Dunner, L.L.P.

[57] ABSTRACT

An apparatus for magnetically recording photographic data for an advanced photo system camera comprises a film transport sensing unit for sensing perforations in a film and for generating a signal per each perforation, an operation control unit for controlling the operation of the magnetic recording according to the signal from the film transport sensing unit, and a magnetic recording unit for magnetically recording photographic data on the film, based on the signals from the operation control unit. The apparatus further comprises a film transport unit for advancing successive frames of the film according to the signals from the operation control unit.

7 Claims, 7 Drawing Sheets

APPARATUS AND METHOD FOR MAGNETICALLY RECORDING PHOTOGRAPHIC DATA FOR AN ADVANCED PHOTO SYSTEM CAMERA

BACKGROUND OF THE INVENTION

1. Field of the Invention

The present invention relates to apparatus and methods for magnetically recording photographic data for an advanced photo system (APS) camera on the basis of the frequency of a signal from a sensing means that senses perforations in the film.

2. Description of Related Art

Recently, photosensitive films with magnetic tracks have been developed in which photographic data, such as the F-number and the shutter speed, can be magnetically recorded. In conventional APS cameras using this type of film, the photographic data on each frame of the film is recorded in the magnetic tracks after a picture has been taken. The photographic data is recorded on the basis of a magnetic recording frequency. As shown in FIG. 1, a conventional APS camera controls the magnetic recording frequency using a winding gear 2, geared into a winding motor 1. A photointerrupter 53 generates a pulse signal depending on the speed of revolution of one of the slits on disc 51 connected to winding gear 2; as such, the pulse signal controls the magnetic recording frequency. Because the magnetic recording frequency is proportional to the speed of the film transport, the density of the photographic data recorded on the frame remains uniform. However, conventional APS cameras incorporate an additional device for detecting the speed of the film transport motor. Therefore, the structure of the APS camera is complicated and relatively expensive.

SUMMARY OF THE INVENTION

An object of the present invention to provide an apparatus and a method for magnetically recording photographic data for an APS camera. The present invention magnetically records the photographic data on the basis of the frequency of a signal from a sensor that senses the perforations on a film.

Additional objectives and advantages of the invention will be set forth in part in the description which follows, and in part will be obvious from the description, or may be learned by practice of the invention. The objectives and advantages of the invention will be realized and attained by means of the elements and combinations particularly pointed out in the appended claims.

To achieve the objectives and in accordance with the purpose of the invention, as embodied and broadly described herein, the invention comprises a film transport sensor for sensing perforations in the film and for generating a signal per each perforation. The invention further comprises a controller that generates a film transport signal for advancing successive frames of the film after each exposure, measures a valid time instance in which the signal from the film transport sensor generates a magnetic recording frequency, and generates a driving signal according to the magnetic recording frequency. The invention additionally comprises a magnetic recording unit for magnetically recording photographic data on the film according to the driving signal as well as a film transport unit for advancing the successive frames of the film according to the film transport signal.

In order to achieve these objectives, the present invention also comprises the steps of advancing an exposed frame, measuring a valid time instance for a signal which senses the perforations in the frame as the frame advances, generating a magnetic recording frequency based on the valid time, and magnetically recording photographic data on the frame based on the magnetic recording frequency.

In the present invention, the control means generates the magnetic recording frequency f according to the following formula:

$$f = N/T1$$

where T1 represents the valid time instance of the first perforation sensing signal and N represents a temporary integer.

BRIEF DESCRIPTION OF THE DRAWINGS

The accompanying drawings, which are incorporated in and constitute part of this specification, illustrate one embodiment of the invention and, together with the description, serve to explain the principles of the invention. In the drawings.

DETAILED DESCRIPTION OF THE PREFERRED EMBODIMENTS

Reference will now be made in detail to the present preferred embodiment of the invention, an example of which is illustrated in the accompanying drawings.

Figure 1:
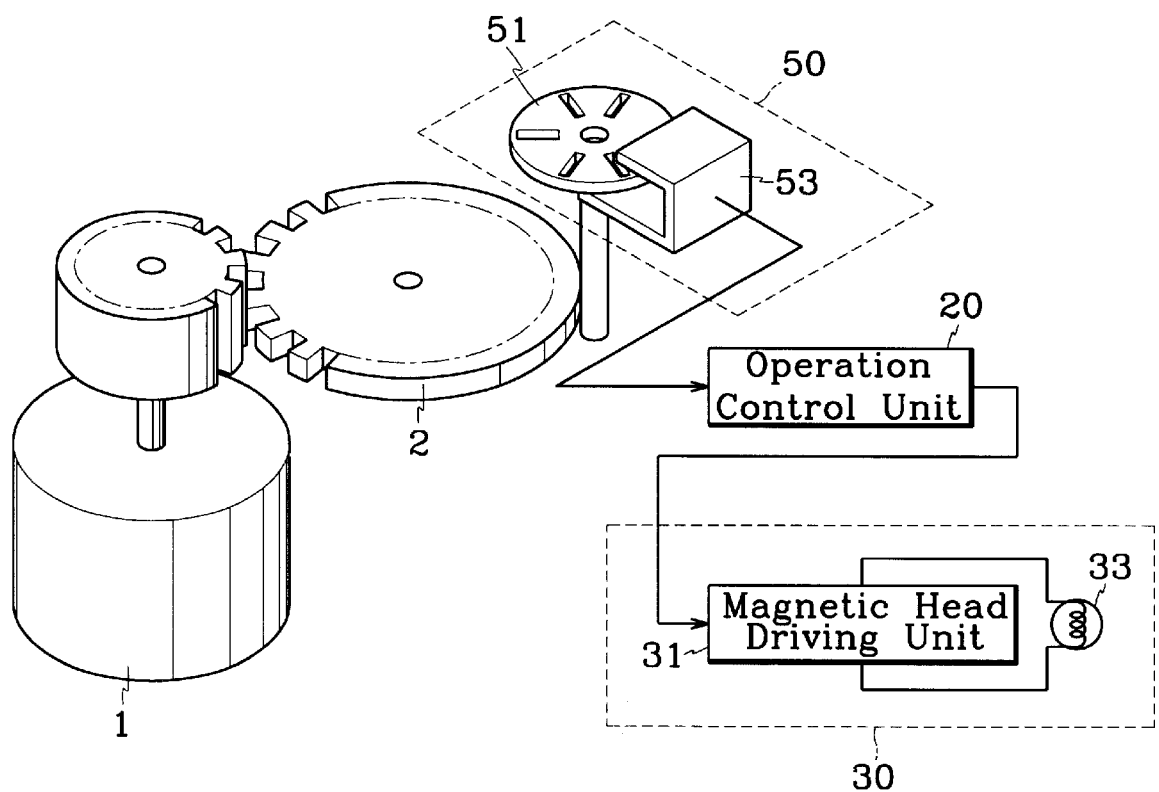
FIG. 1 is a perspective view of a conventional APS camera.
Figure 2:
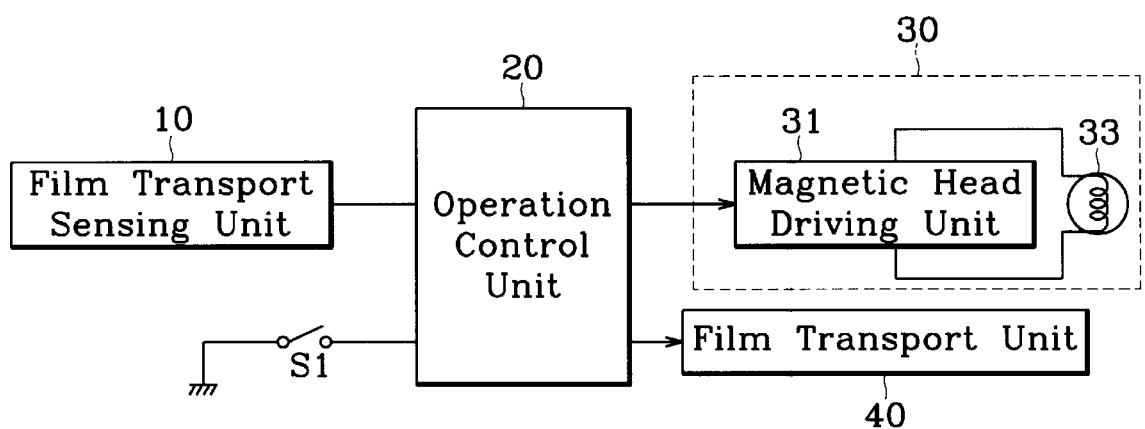
FIG. 2 is a block diagram of an apparatus for magnetically recording photographic data for an APS camera in accordance with a preferred embodiment of the present invention.

As shown in FIG. 2, an apparatus for magnetically recording photographic data of an APS camera comprises a film transport sensing unit 10 for both sensing a perforation in a film and for generating a signal based on the perforation; an operation control unit 20 for controlling the operation of the magnetic recording according to the signals from film transport sensing unit 10; and a magnetic recording unit 30 for magnetically recording photographic data on the film based on the signals from operation control unit 20. The apparatus further comprises a film transport unit 40 for advancing a frame of the film according to the signals received from operation control unit 20.

Figure 3:
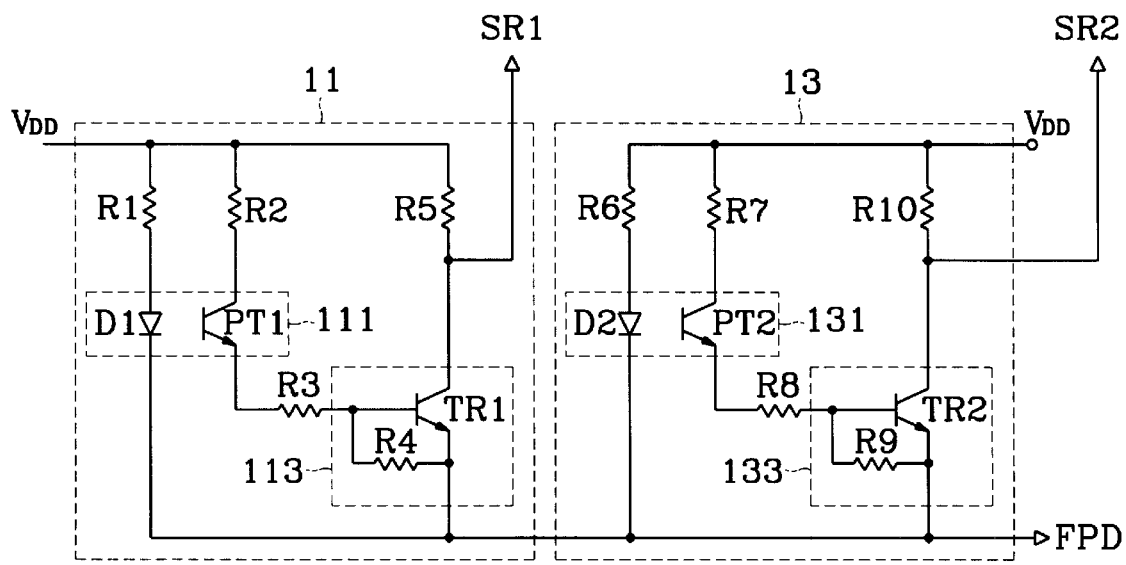
FIG. 3 is a schematic circuit diagram of the film transport sensing unit of FIG. 2.
Figure 4:
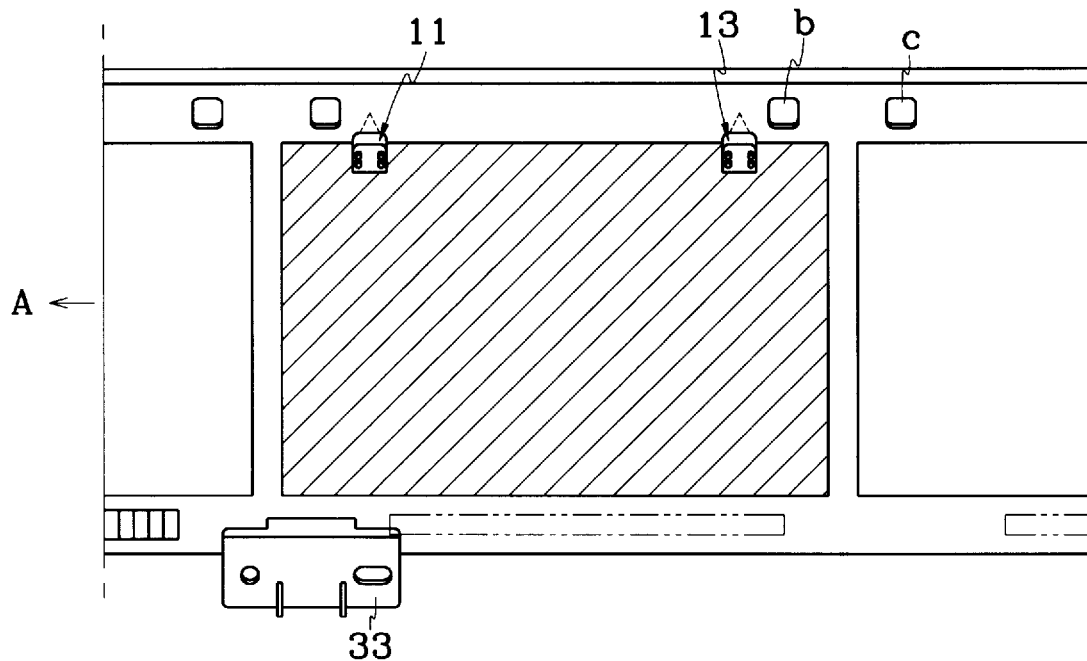
FIG. 4 is a perspective view of a film and a film transport sensing unit provided for sensing the film transport.

As shown in FIGS. 3 and 4, film transport sensing unit 10 is positioned against the side of the film where magnetic material is located, which is opposite to the exposure side. Film transport sensing unit 10 comprises a first sensing unit 11 and a second sensing unit 13. Second sensing unit 13 is positioned where perforations b and c are located in the film.

Referring to FIG. 3, first sensing unit 11 comprises a photocoupler 111, which has a LED (light emitting diode)

D1 and a phototransistor PT1, and a signal generating unit 113 for generating an electric signal on the basis of the signal from photocoupler 111. Second sensing unit 13 comprises a photocoupler 131 with an LED D2 and a phototransistor PT2, and a signal generating unit 133 for generating an electric signal based on the signal from photocoupler 131.

Magnetic recording unit 30, as shown in FIG. 2, comprises a magnetic head 33 for magnetically recording the photographic data on the magnetic recording portion of the film. The magnetic recording unit also includes a magnetic head driving unit 31 for driving magnetic head 33 based on the signals from operation control unit 20.

Figure 7:
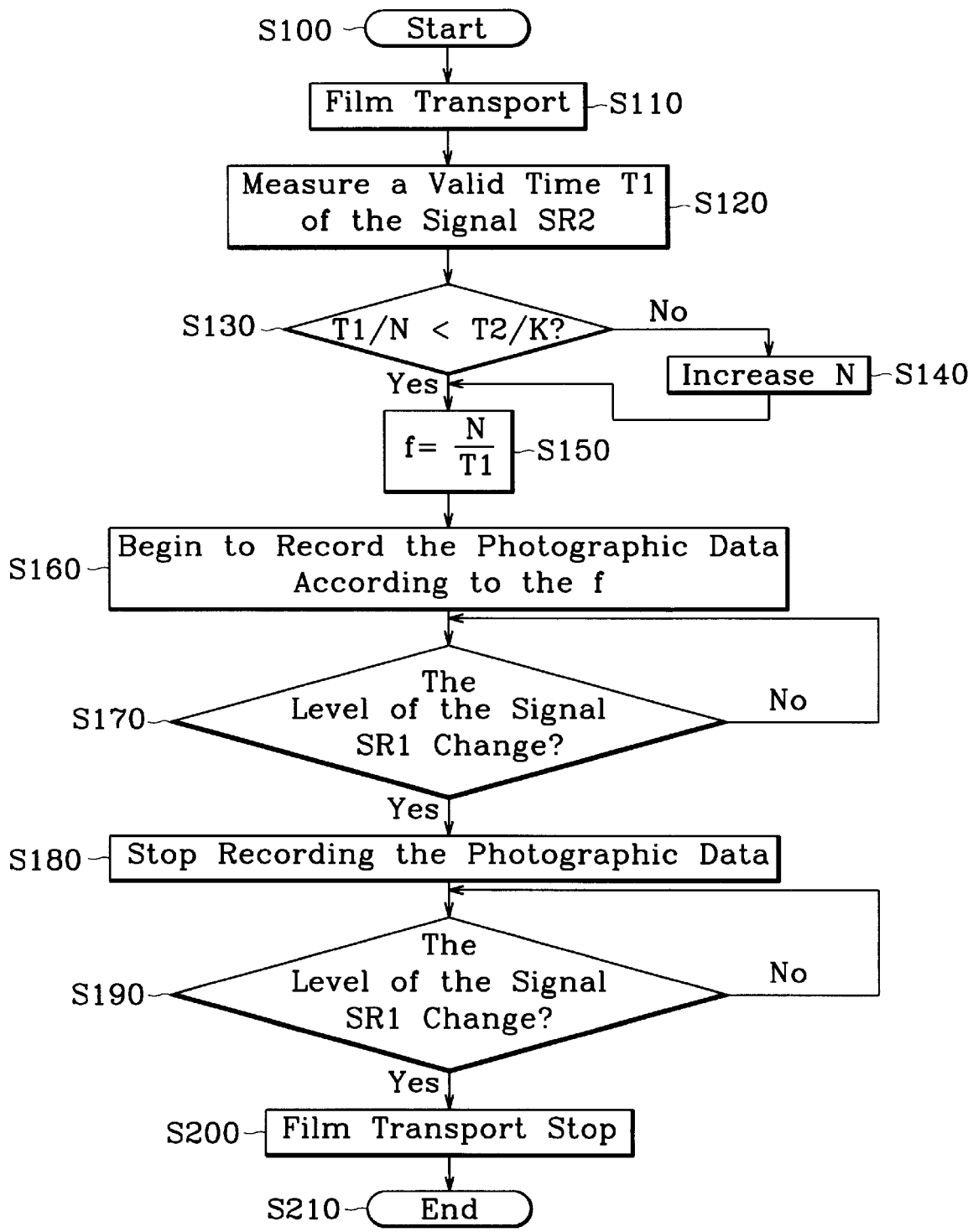
FIG. 7 is a flowchart showing the operation for magnetically recording photographic data in accordance with the preferred embodiment of the present invention.

FIG. 7 illustrates the operation of operation control unit 20. Operation begins at step S100 after exposing one frame of the film. At step S110, operation control unit 20 makes film transport unit 40 advance the exposed frame. While the exposed frame is advancing, LEDs D1 and D2 emit light on the film. When the light passes through a perforation in the film, the phototransistors PT1 and PT2 receive the light; when the light reflects on portions of the film without perforations, phototransistors PT1 and PT2 do not receive the light. Therefore, photocouplers 111 and 131 generate different signals according to the presence of perforations in the film.

Figure 5:
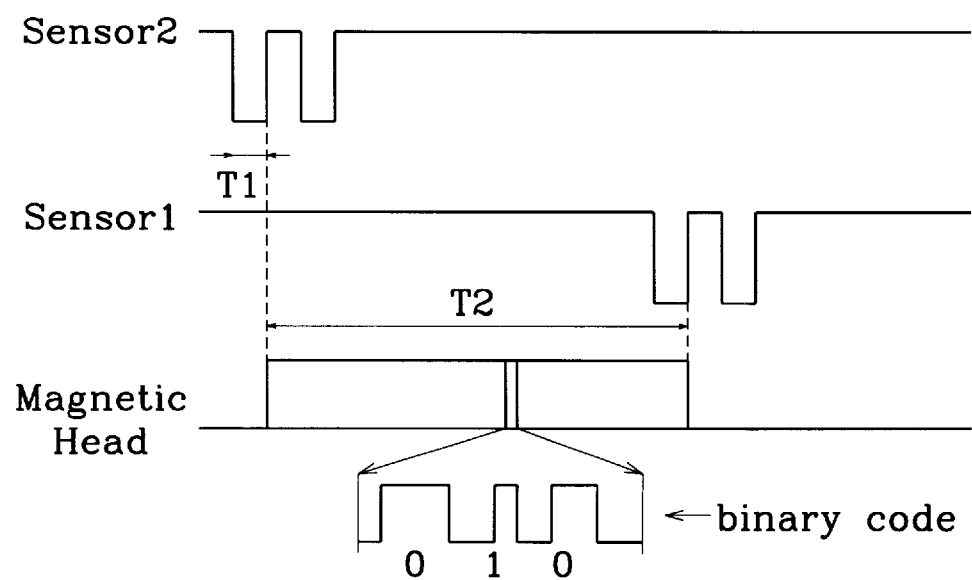
FIG. 5 is a time chart for the operation of the apparatus of FIG. 2.
Figure 6A:
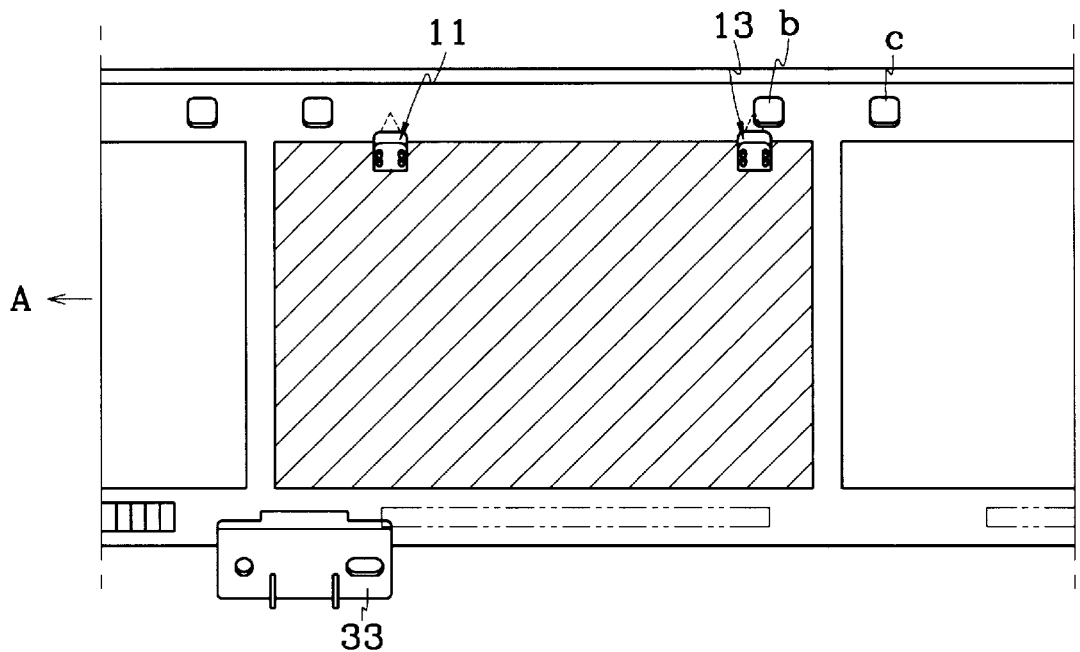
FIGS. 6A–6E shows state of the film transport operation.

FIG. 6A illustrates that, as the exposed frame advancing in the direction A, second sensing unit 13 senses the perforation b indicating the end of the frame, generates a signal based on perforation b, and transmits the signal to operation control unit 20. Specifically, as shown in FIGS. 3 and 5, when light, emitted from LED D2, passes through perforation b, phototransistor PT2 receives the light and transistor TR2 in signal generating unit 133 turns on to generate a low level signal Sensor2 (SR2).

At step S120, operation control unit 20 receives signal SR2 and measures a valid time instance T1 during which signal SR2 is maintained at a low level.

At step S130, the quantity T1/N is compared to the quantity T2/K, where T1 represents a valid time of signal SR2, N represents a predetermined integer, T2 represents a predetermined magnetic recording time, and K represents the number of data bits based on the photographic data to be recorded per frame. When the value of quantity T1/N is equal to or greater than the value of T2/K, the valid time T1 is long. In such cases, step S140 increases the value of predetermined integer N so as to satisfy the condition T1/N<T2/K. Accordingly, at step S150, the magnetic recording frequency f is determined by the value of N/T1, where N is the increased value.

When the value of T1/N is less than T2/K, valid time T1 is relatively short in duration. In such cases, step S150 determines the magnetic recording frequency f by the value of N/T1, where N is the predetermined value.

Figure 6B:
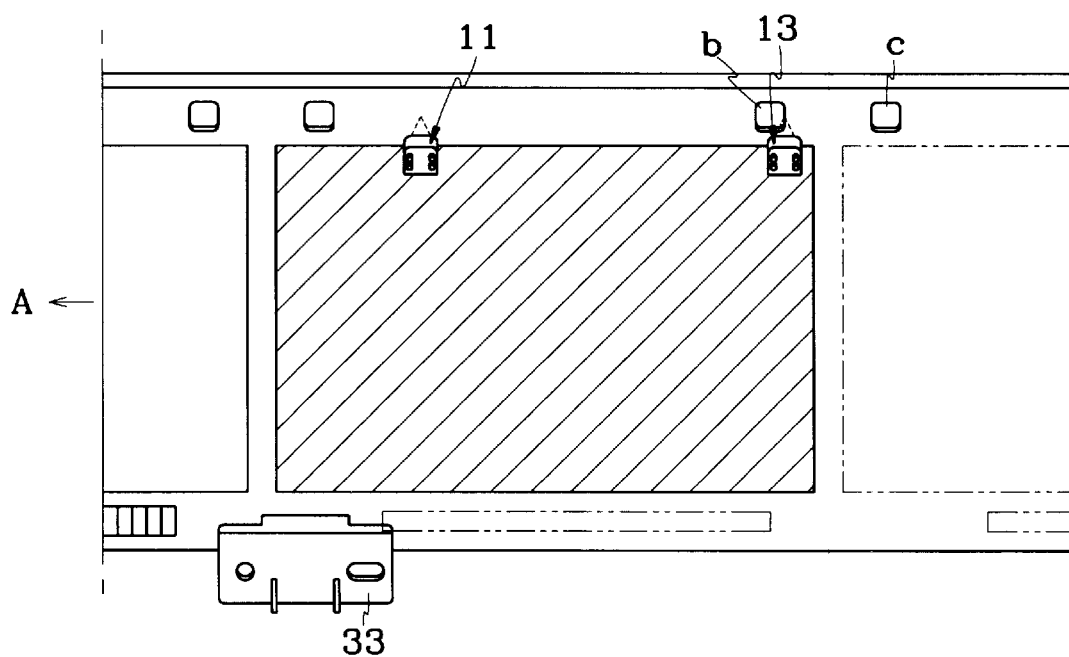
Figure 6C:
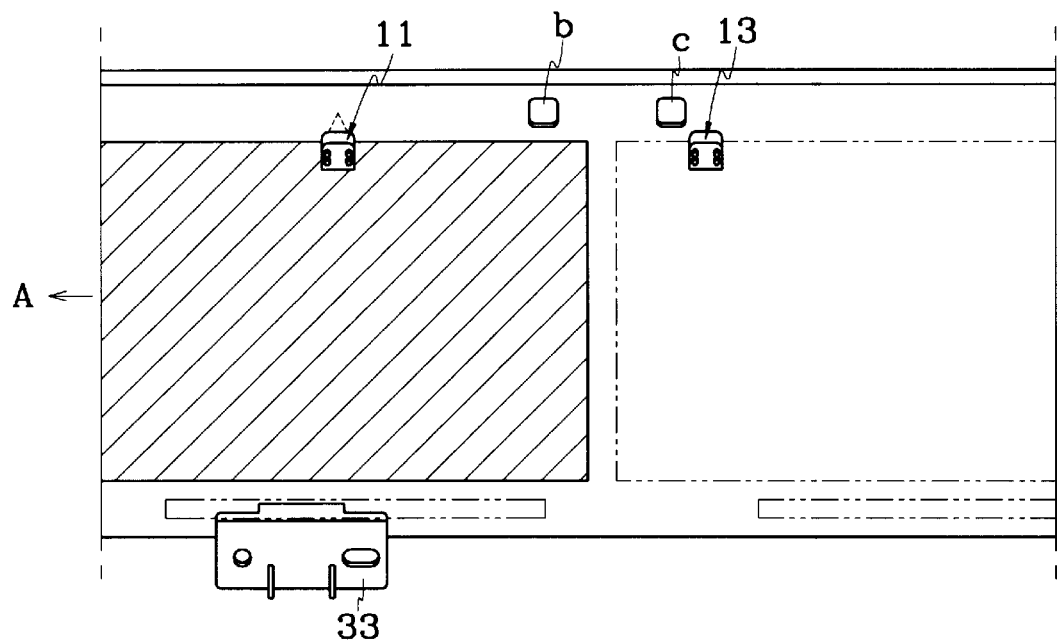

At step S160, magnetic recording unit 30 begins to magnetically record on the film's magnetic material the photographic data, such as user information, date of shot, shutter speed, F-number etc., at a magnetic recording frequency f. The recording is triggered when the rising edge of signal SR2 transitions from the low level to a high level, i.e. when perforation b just passes second sensing unit 13. As shown in FIGS. 6B–6C, the magnetic recording unit 30 records the photographic data by using a magnetic head 33.

Figure 6D:
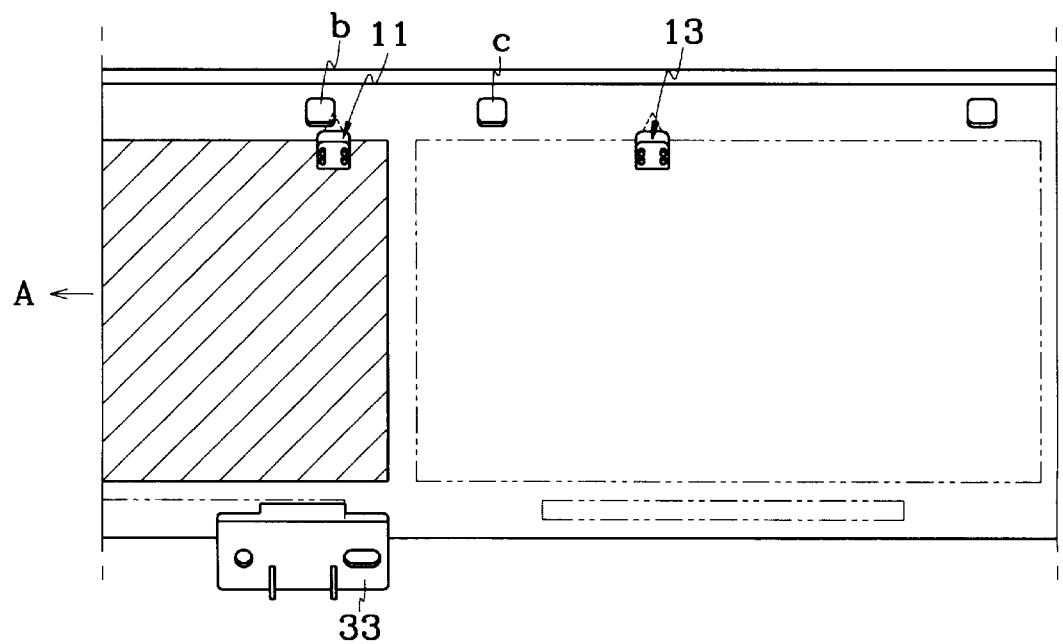

At steps S170–S180, as illustrated in FIG. 6D, as the frame advances in the direction A, first sensing unit 11 senses perforation b which indicates the end of the frame, generates a signal per perforation b, and transmits the signal to operation control unit 20. Referring to FIGS. 3 and 5, when light emitted from LED D1 passes through perforation b, phototransistor PT1 receives the light and transistor TR1 in signal generating unit 113 turns on to generate a low level signal Sensor1 (SR1). Operation control unit 20 then triggers magnetic recording unit 30 to stop recording the photographic data on the magnetic portion of the film when the rising edge of signal SR1 changes from the low level to a high level, i.e. when perforation b just passes first sensing unit 11.

Figure 6E:
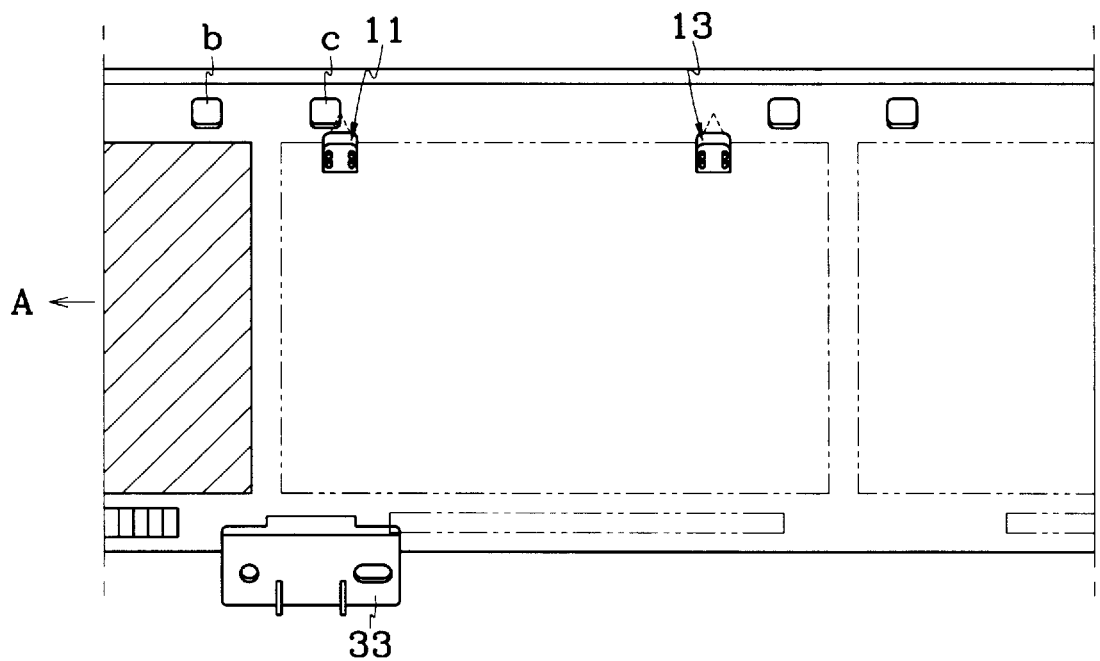

At step S190–S210, as shown in FIG. 6E, operation control unit 20 makes film transport unit 40 stop advancing the frame after perforation c passes first sensing unit 11.

As described above, since the photographic data is magnetically recorded on the film, according to the frequency of a signal from the sensing means which senses perforations in the film, the user can easily record the photographic data without additional recording devices. Therefore, the structure of the camera is relatively simple and inexpensive.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for magnetically recording photographic data for an advanced photo system camera, comprising:

film transport sensing means for sensing a perforation in a photosensitive film with magnetic material and for generating a perforation sensing signal based on the perforation;

control means for generating a film transport signal to advance a frame of the film after each exposure, for measuring a valid time of the perforation sensing signal, for generating a magnetic recording frequency that satisfies the following condition:

$$f=N/T1$$

where f represents the magnetic recording frequency, T1 represents the valid time of the perforation sensing signal, and N represents a predetermined integer, and for generating a driving signal according to the magnetic recording frequency;

magnetic recording means for magnetically recording the photographic data on the photosensitive film with magnetic material, based on the driving signal from the control means; and film transport means for advancing a frame of the film according to the film transport signal from the control means.

2. The apparatus of claim 1, wherein said predetermined integer N is increased so as to satisfy the following condition:

$$T1/N<T2/K$$

where T2 represents a predetermined magnetic recording time and K represents a number of data bits, which is based on the photographic data to be recorded with respect to each frame.

3. The apparatus of claim 1, wherein said film transport sensing means includes means for positioning said film transport sensing means against a side of the film where the magnetic material is located.

4. The apparatus of claim 3, wherein, said film transport sensing means includes a first sensing unit for sensing a perforation and for generating a first sensing signal, and a second sensing unit for sensing a perforation and for generating a second sensing signal.

5. The apparatus of claim 4, further comprising magnetic recording means begins recording the photographic data upon receiving the second sensing signal, and the magnetic recording means stops recording the photographic data upon receiving the first sensing signal.

6. A method for magnetically recording photographic data for an advanced photo system camera, comprising the steps of:

advancing an exposed frame of a photosensitive film;

measuring a valid time of a signal representing the sensing of a perforation in the frame;

generating a magnetic recording frequency according to the valid time, the magnetic recording frequency satisfying the following condition:

$$f=N/T1$$

where f represents the magnetic recording frequency, T1 represents the valid time, and N represents a predetermined integer; and magnetically recording the photographic data on the frame on the basis of the magnetic recording frequency.

7. The method of claim 6, wherein said predetermined integer is increased so as to satisfy the following condition:

$$T1/N<T2/K$$

where T2 represents a magnetic recording time, which is predetermined, and K represents the number of data bits, which is determined according to the photographic data to be recorded with respect to each frame.

* * * * *